(12) United States Patent
Clemencon et al.

(10) Patent No.: US 8,738,534 B2
(45) Date of Patent: May 27, 2014

(54) METHOD FOR PROVIDING WITH A SCORE AN OBJECT, AND DECISION-SUPPORT SYSTEM

(75) Inventors: Stephan Clemencon, Le Perreux sur Marne (FR); Nicolas Vayatis, Paris (FR)

(73) Assignee: Institut Telecom-Telecom Paristech (FR)

( * ) Notice: Subject to any disclaimer, the term of this patent is extended or adjusted under 35 U.S.C. 154(b) by 438 days.

(21) Appl. No.: 12/877,461

(22) Filed: Sep. 8, 2010

(65) Prior Publication Data

US 2012/0059790 A1 Mar. 8, 2012

(51) Int. Cl.
| | | |
|---|---|---|
| G06F 17/00 | (2006.01) | |
| G06N 7/00 | (2006.01) | |
| G06N 7/08 | (2006.01) | |
| G06F 7/00 | (2006.01) | |
| G06F 17/30 | (2006.01) | |
| G06F 7/50 | (2006.01) | |

(52) U.S. Cl.
USPC .............. 705/55; 707/755; 707/756; 708/713

(58) Field of Classification Search
USPC ...................... 706/55; 707/755, 756; 708/713
See application file for complete search history.

(56) References Cited

U.S. PATENT DOCUMENTS

| | | | | |
|---|---|---|---|---|
| 7,016,887 | B2* | 3/2006 | Stockfisch | 706/45 |
| 7,031,948 | B2* | 4/2006 | Lee | 706/14 |
| 2009/0012715 | A1* | 1/2009 | Goldfarb-Rumyantzev | 702/19 |
| 2009/0104602 | A1* | 4/2009 | Fernandez-Reyes et al. | 435/6 |

OTHER PUBLICATIONS

Clémençon, Stéphan, and Nicolas Vayatis. "Tree-structured ranking rules and approximation of the optimal ROC curve." Proceedings of the 2008 conference on Algorithmic Learning Theory. Lect. Notes Art. Int. vol. 5254. 2008.*
Bertail, Patrice, Stéphan Clémençon, and Nicolas Vayatis. "On bootstrapping the ROC curve." Proc. of Neur. Inf. Proc. Syst (2008).*
Clémençon, Stéphan, and Nicolas Vayatis. "Tree-based ranking methods." Information Theory, IEEE Transactions on 55.9 (2009): 4316-4336.*
Clémençon, Stéphan, and Nicolas Vayatis. "Approximation of the optimal ROC curve and a tree-based ranking algorithm." Algorithmic Learning Theory. Springer Berlin/Heidelberg, 2008.*
Clémençon, Stéphan, and Nicolas Vayatis. "Ranking the best instances." The Journal of Machine Learning Research 8 (2007): 2671-2699.*
Clémençon, Stéphan, and N. Vayatis. "On partitioning rules for bipartite ranking." Proceedings of AISTATS. No. 5. 2009.*
Inernational Search Report for Application No. PCT/EP2011/065555 dated May 29, 2012.

(Continued)

*Primary Examiner* — Jeffrey A Gaffin
*Assistant Examiner* — James F Sugent
(74) *Attorney, Agent, or Firm* — Lerner, David, Littenberg, Krumholz & Mentlik, LLP (57) ABSTRACT

The present invention is related to a decision-support system and method for providing with a score an object represented by a target item from a multidimensional space, said score being representative of the probability that the object satisfies a given binary property. The method and/or decision support-system may be performed in a computer environment comprising processing means connected to memory means.

19 Claims, 6 Drawing Sheets

(56) References Cited

OTHER PUBLICATIONS

N. Baskiotis. S. Clémençon, "Tutorial: Getting started with TreeRank in R", TreeRank package for R. version 1.0-0, Mar. 4, 2010. XP55027125, Retrieved from the Internet: URL:http://cran.r-project.org/src/contrib/Archive/TreeRank/TreeRank_1.0-0.tar.gz.

S. Clémençon et al., "AUC optimization and the two-sample problem", Proceedings of the 23rd annual conference on Neural Information Processing Systems (NIPS'22), Nov. 24, 2009. XP55027124, Retrieved from the Internet: URL:http://books.nips.cc/papers/files/nips22/NIPS2009_0340.pdf.

S. Clémençon et al., "Données avec label binaire: avancées récentes dans le domaine de l'apprentissage statistique d'ordonnancements", Actes de la 12è Conférence d'Apprentissage automatique (CAp'10), May 17, 2010, pp. 201-216, XP55027120, Retrieved from the Internet: <URL:http:jjcap10.isima.fr/images/actes_cap2010_final.pdf (Provided English Abstract only).

S. Robbiano, "Publications & Séminaire des doctorants TSI/STA (extraits)", Page personelle de Sylvain Robbiano à Télécom ParisTech, May 14, 2012, XP55027141, Retrieved from the Internet: URL:http://perso.telecom-paristech.fr/-robbiano/.

S. Robbiano: "Ordonnancement multi-classes: optimalité et premieres bornes", Résumes des 43èJournées de Statistiques (JdS'11) de la Société Française de Statistique (SFdS), May 25, 2011, XP55027118, Retrieved from the Internet: URL:http://jds2011.tn.refer.org/Mercredi25Mai.pdf.

\* cited by examiner

METHOD FOR PROVIDING WITH A SCORE AN OBJECT, AND DECISION-SUPPORT SYSTEM

FIELD OF THE INVENTION

The field of this invention is that of knowledge-based systems supporting decision-making activities.

More particularly, the invention relates to a method for providing with a score an object.

BACKGROUND OF THE INVENTION

Many activities in various fields, from finance to medicine, require evaluating a risk and taking a decision: it may be the decision to make an investment, to begin to treat a patient for a given pathology, to decide whether a document is relevant, to reject a product as defective, or simply to choose between two or more possibilities.

A family of computer tools, named "decision support systems" has the objective to help to take decisions by analysing massive data. For example, knowing a large number a financial data, such a system try to establish whether an investment should be made.

Methods of supervised classification, located at the interface between mathematics and computer science, propose to class the cases to be tested by associating them a binary label, such as "good payer" versus to "insolvent payer" "relevant documents" and "irrelevant document," patient "healthy" to "ill" or product "conform" to "not conform". However, such methods only attempt to predict the most likely label for a case. The risk of doing a mistake is only somewhat reduced.

Methods of scoring/ranking propose another approach: the aim of such methods is to learn how to sort/order the cases, so that a large number of "good payers" or "relevant documents" are at the top of the list with maximum likelihood.

The most natural way of ordering multivariate observations is to use a scoring function, assigning to each observed case (new or not) a numerical value—a "score"—interpretable as a degree of risk or relevance. The quality of this scoring function is usually assessed using a functional criterion, namely a Receiver Operating Characteristic (ROC) curve, which allows a very visual display of true positive rate in relation to the rate of false positives. The Recall-Precision curve widely used in information retrieval is a similar approach to visualize the results of discrimination, when the rate of positive label data is very high or very low.

While many powerful algorithms (CART, SVM, boosting, random forests) of supervised classification of high dimensional data are already known, no algorithm of the "machine-learning" type was far dedicated to the problem of scoring. In most applications, the approach is to use conventional statistical methods, such as logistic regression (linear) or linear discriminant analysis, based primarily on manual data preprocessing, such as modelling distribution of the observations, a truncation of information, etc. . . . These approaches also face the problem caused by the exponential increase in data volume associated with adding extra dimensions ("curse of dimensionality"). Besides, the binary classification methods sometimes incorrectly use the "distance to the margin" as score.

There is a consequently a need for an improved method of scoring based on machine-learning.

SUMMARY OF THE INVENTION

For these purposes, the present invention provides a method for providing with a score an object represented by a target item from a multidimensional space, said score being representative of the probability that the object satisfies a given binary property, said method being performed in a computer environment comprising processing means connected to memory means, comprising the following steps:

(a) providing and storing in the memory means data representative of a set of sample items from said multidimensional space, each sample item being associated with a binary label indicating if an object represented by said example item satisfies or not the given binary property;

(b) storing in the memory means data representative of the target item;

(c) with said processing means, generating and storing in said memory means data representative of an oriented binary tree with a given height, said binary tree being defined by a plurality of nodes having index values in relation with their position in the binary tree, said nodes comprising a root node, intermediate nodes and terminal nodes, and each node being associated with a subspace of the multidimensional space according to the following rules:

if the node is a root node, the associated subspace is the whole multidimensional subspace;

if the node is a non-terminal node, its associated subspace is split into two disjoint subspaces $\epsilon_+$ and $\epsilon_-$ respectively associated with a first child node and a second child node of said non-terminal node, said splitting being performed by the processing unit according to a classifier minimizing the number of sample items which do not satisfy the given binary property to belong to the subspace $\epsilon_+$, and/or the number of sample items which satisfies the given binary property to belong to the subspace $\epsilon_-$;

(d) with said processing means, associating with at least each terminal node of the binary tree a score depending on its index value in the binary tree, and storing the score value in the memory means;

(e) with said processing means, identifying a target node, the target node being a terminal node whose associated subspace comprises the target item; and (f) outputting the score value associated with said target node.

This method enables superior performances, highlighted through extensive simulations, which arise from the fact that it actually solves the optimization problem posed functional: it builds a recursive scoring function that converges to an adaptive approximation increasingly close to the optimal ROC curve.

In addition, proposed techniques of resampling (bootstrap) enable to easily obtain large amounts of samples, leading to very reliable scoring rules. Besides, the nonparametric aspect of the approach allows dealing with data often poorly adapted to Gaussian distributions.

But, the most important point is that this method allows generating scoring rules that can easily interpreted by a non-statistician. What is called a Scoring rule here is a combination of simple binary rules for which it is possible to quantify the impact on each attribute or component of the vector of observation.

For example, in the case of medical diagnosis, when the observation vector consists of a set of measures of blood parameters, scoring rules generated will result in the form of value ranges for each parameter, defining the two categories "healthy patient" and "sick patient". The number of categories may of course be greater than two.

Finally, these rules can be easily visualized as an oriented binary tree where the most interesting parameters appearing in the top part of the tree, so as to be directly understandable by a non-statistician user.

Preferred but non limiting features of the present invention are as follow:

the index value of each node comprises a pair of values, the first index value representing the depth of the node in the binary tree, and the second index value representing the position of the node at a given level of depth in the tree;

the index of the root node is (0,0), and the indexes of the first and the second child nodes of a non-terminal node whose index is (d,k) are respectively (d+1,2k) and (d+1,2k+1);

the score associated with a node whose index is (d,k) is $2^D(1-k/2^d)$, D being the height of the binary tree;

the splitting is performed by minimizing with said processing means a weighted combination of the number of sample items which do not satisfy the given binary property to belong to the subspace $\epsilon_+$, and the number of sample items which do satisfy the given binary property to belong to the subspace $\epsilon_-$;

the weights in said weighted combination are respectively the rate of sample items which satisfy the given binary property in the subspace being split into disjoint subspaces $\epsilon_+$ and $\epsilon_-$, and the rate of sample items which do not satisfy the given binary property in the subspace being split into disjoint subspaces $\epsilon_+$ and $\epsilon_-$;

the splitting is performed by minimizing by processing means the value of $$\hat{L}_{\varepsilon,\omega}(\varepsilon_+) = \frac{2}{n}(1-\omega)\sum_{i=1}^{n} 1\{X_i \notin \varepsilon_+, Y_i = +1\} + \frac{2}{n}\omega\sum_{i=1}^{n} 1\{X_i \in \varepsilon_+, Y_i = -1\}$$

where:

$(X_1,Y_1) \ldots (X_n,Y_n)$ is the set of sample items associated with their binary label, and $\omega$ is the rate of sample items which satisfy the given binary property in the subspace being split into disjoint subspaces $\epsilon_+$ and $\epsilon_-$;

the number of sample items and/or the number of dimensions of associated subspace to take into account during said splitting is reduced;

the method comprises a step (c1) of selecting by said processing means a subtree of the formed binary tree and replacing the binary tree by said subtree, wherein said step (c1) follows step (c);

a Receiver Operating Characteristic curve is built by the processing means at step (c1) for each possible subtree, and stored is the memory means, the selected subtree being the subtree determined by the processing means as having the highest Area Under its associated Receiver Operating Characteristic curve;

a Receiver Operating Characteristic curve is built by the processing means at step (c1) for each possible subtree, and stored is the memory means, the selected subtree being the subtree determined by the processing means as having the highest Complexity-Penalized Area Under its associated Receiver Operating Characteristic curve;

step (c1) comprises a cross-validation test performed by the processing means on the set of possible subtrees;

a plurality of sets of sample items are generated and stored at step (a), an oriented binary tree being formed and stored for each set of sample items;

each set of sample items is a bootstrap replicate generated by said processing means by resampling a main set of sample items;

the method comprises a step (d1) of aggregating the plurality of formed binary trees and determining a best scoring rule, said step (c1) following step (c);

step (d1) comprises the following sub-steps:

for each formed binary tree, provide and store in memory means the partition of the multidimensional space formed by the subspaces associated with the terminal nodes;

aggregating by said processing means these partitions to form a common subpartition;

for each formed binary tree, providing and storing a scoring rule by scoring each part of the common subpartition;

for each scoring rule, providing and storing a ranking of the parts scored according the scoring rule;

determining by said processing means a median ranking among the plurality of ranking, and storing the median ranking in said memory means; and selecting by said processing means as the best scoring rule the scoring rule associated with the median ranking;

the sub-step of determining a median ranking comprises calculating by said processing means a dissimilarity rate between each pair of rankings, and selecting by said processing means as the median ranking the ranking which shows the lowest dissimilarity rate with the other rankings;

the median ranking is a ranking $\preceq^*$ such that $$\sum_{m=1}^{N} \delta(\preceq^*, \preceq_m) = \min_{\preceq} \sum_{m=1}^{N} \delta(\preceq, \preceq_m)$$

where:

$\preceq_1 \ldots \preceq_N$ are the rankings, and $\delta(\preceq_1, \preceq_2)$ is the dissimilarity rate between a pair of rankings;

the dissimilarity rate is defined as $$\delta(\preceq_1, \preceq_2) = \frac{1}{K}\sum_{i=1}^{K} (R_{\preceq_1}(C_i) - R_{\preceq_2}(C_i))^2$$

where:

$C_i \ldots C_K$ are the parts of the common subpartition, and $R_{\preceq_1}(C_i)$ is the rank of the part $C_i$ among the other parts of the common subpartition according to the ranking $\preceq$;

the dissimilarity rate is defined as $$\delta(\preceq_1, \preceq_2) = \frac{1}{K}\sum_{i=1}^{K} |R_{\preceq_1}(C_i) - R_{\preceq_2}(C_i)|$$

where:

$C_i \ldots C_K$ are the parts of the common subpartition, and $R_{\preceq_1}(C_i)$ is the rank of the part $C_i$ among the other parts of the common subpartition according to the ranking $\preceq$;

the dissimilarity rate is defined as $$\delta(\leq_1, \leq_2) = \frac{2}{K(K-1)} \sum_{i \neq j} 1\{(R_{\leq_1}(C_i) - R_{\leq_1}(C_j)) \cdot (R_{\leq_2}(C_i) - R_{\leq_2}(C_j)) < 0\} +$$

$$\frac{1}{K(K-1)} \sum_{i \neq j} 1\{R_{\leq_1}(C_i) = R_{\leq_1}(C_j), R_{\leq_2}(C_i) \neq R_{\leq_2}(C_j)\} +$$

$$\frac{1}{K(K-1)} \sum_{i \neq j} 1\{R_{\leq_1}(C_i) \neq R_{\leq_1}(C_j), R_{\leq_2}(C_i) = R_{\leq_2}(C_j)\}$$

where:
$C_i \ldots C_K$ are the parts of the common subpartition, and
$R_{\leq_1}(C_i)$ is the rank of the part $C_i$ among the other parts of the common subpartition according to the ranking $\leq_1$.

In a second aspect, the invention provides a decision-support system, comprising processing means, input means, output means, memory means, the processing means being configured to implement a method according to the first aspect of the invention.

BRIEF DESCRIPTION OF THE DRAWINGS

The above and other objects, features and advantages of this invention will be apparent in the following detailed description of an illustrative embodiment thereof, with is to be read in connection with the accompanying drawings wherein:

FIG. 6b is a graphic representing the bi-level sets of the regression function associated with the example of FIG. 5a;

DETAILED DESCRIPTION OF A PREFERRED EMBODIMENT

Referring to the drawings, a method according to a preferred embodiment of the invention will now be described.
Preliminaries
The probabilistic framework is exactly the same as the one in standard binary classification. Is denoted for example by (X,Y) a pair of random variables where $Y \in \{+1; -1\}$ is a binary label and X is an item modeling some observation for predicting Y, taking its values in a feature space $\chi \subset \mathbb{R}^q$ of high dimension. Thus, each couple (X,Y) represents an object, this object satisfying or not a given binary property. If the binary property is satisfied, Y=+1. Else, Y=−1. For example, as explained, in a context of medical diagnosis, the object is a patient, and the binary property is "the patient is healthy". The item associated with a patient may be a tuple comprising the body temperature of the patient, its age, and the concentration of given antibodies and/or lymphocytes in its blood.

In the case of three or more categories, a combination of binary properties will be used. For example, to manage three categories "the patient is healthy", "the patient has disease A" and "the patient of disease B", A first label $Y_1$ indicates whether the patient is healthy of not, and in the case $Y_1$=−1 a second label $Y_2$ indicates whether the disease is A or B. These two binary properties can be processed separately. Thus, every multiple classification problem can be reduced to one or more binary classification problem. For the sake of clarity, the following description will be related to a single binary classification problem, but the invention is not limited to this case, and a man skilled in the art would known how to adapt it to any multiple classification problem.

So, the value of the binary label Y of an object is generally unknown, and the aim of the invention is to help to make decisions depending on the value of Y, knowing its item X, named the target item, and knowing the value of Y for a set of sample items $(X_1 \ldots X_K)$. To this end, the method according to the invention proposes to provide with a score s the object represented by the target item X, said score s being representative of the probability that the object satisfies the given binary property, in other words the probability that Y=+1.

This method is performed in a computer environment comprising processing means connected to memory means. For example, the memory means are a hard drive of a computer, and the processing means are a processor of the computer.
Scoring—Data Input First, data representative of the target item and representative of a set of sample items has to be stored in the memory means. Indeed, as already explained, the method according to the invention is based on machine-learning. So, the score function that will provide with a score the object represented by the target item is learnt from the set of sample item.

This set has to be provided. In the medical example, this set may consist in health parameters of various patients which are known to be healthy (Y=+1), and health parameters of various patients which are known to be ill (Y=−1).

The number of sample items is important. The more they are numerous, the more the score will be accurate. Moreover, they have to be very exhaustive, and cover the largest subspace possible of the whole multidimensional space. For example, if all the patients whose health parameters are used as sample items have the same body temperature of 37° C.-38° C., it will be difficult to reliably score patients whose body temperature is above 39° C.
Scoring—Binary Ranking Trees From the set of sample items stored in the memory means, the processing means generated an oriented binary tree. Indeed, the method according to the invention focuses on a specific family of piecewise constant scoring function, those defined by a binary ranking tree namely.

Consider first a complete, left-right oriented, rooted binary tree $T_D$, with a finite depth $D \geq 1$. Every non-terminal node of $T_D$ is associated with a subset $C \subset \chi$ and has two child nodes: a left sibling and a right sibling respectively associated with two subsets $C_{left} \subset C$ and $C_{left} = C/C_{left}$, with $\chi$ as the subset associated with the root node by convention. Such a (complete) ranking tree is called a master ranking tree, and is represented for example by the FIG. 1.

Figure 1:
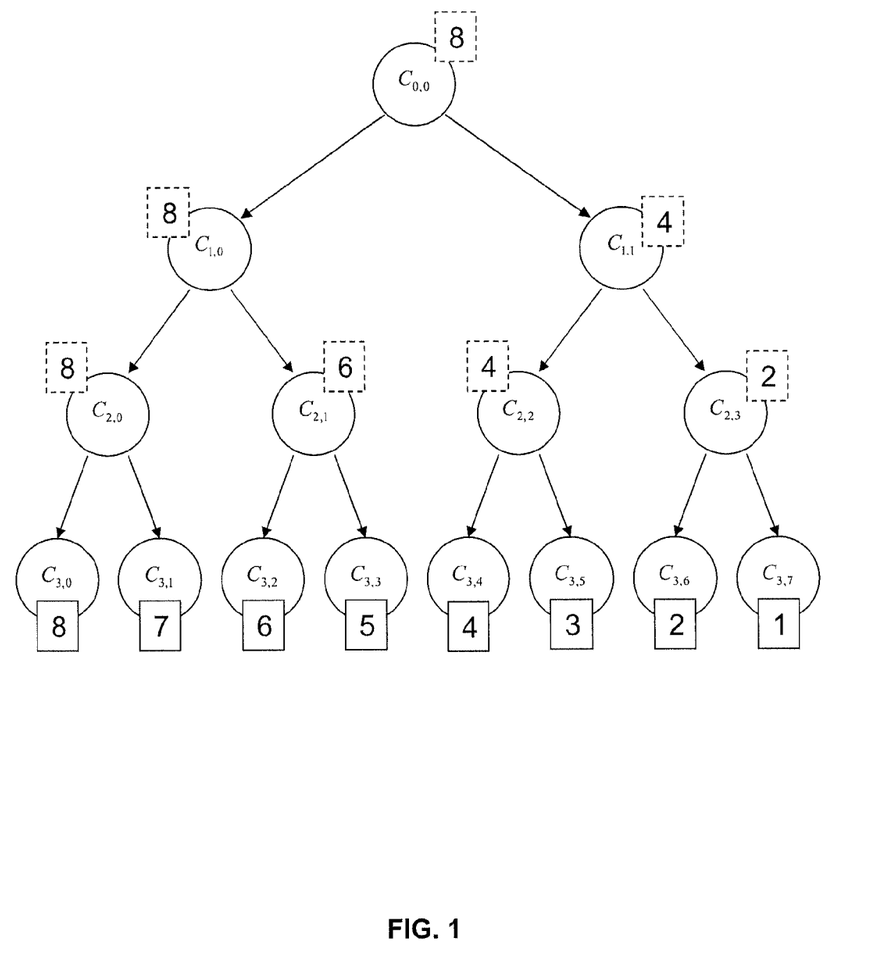
FIG. 1 represents an example of a binary tree used in a method according to the first aspect of the invention.

This way, at any level of the binary tree, the associated subspaces forms a partition of $\chi$. By giving index values to each node in relation with its position in the binary tree, it is possible to associate with at least each terminal node of the binary tree a score depending on its index value in the binary tree. For example, the score may increase when travelling the tree form right to left. Advantageously, the index value of each node comprises a pair of values, the first index value representing the depth of the node in the binary tree, and the second index value representing the position of the node in the binary tree, for example (d,k), with $d \in \{0, \ldots, D-1\}$ and $k \in \{0, \ldots 2^d-1\}$. In this case, the index of the root node is (0,0) and the index of the first and the second child nodes of a non-terminal node whose index is (d,k) are respectively (d+1, 2k) and (d+1,2k+1). Advantageously, with such indexation, the scoring function may be chosen as:

$$s_T(x) = \sum_{(d,k): \text{terminal nodes of } T} 2^D(1-k/2^d) \cdot 1\{x \in C_{d,k}\}$$

In other words, the score associated with a node whose index is (d,k) is $2^D(1-k/2^d)$, i.e. terminal nodes are scored from 1 to $2^D$. Such scoring function is illustrated on FIG. 1.

As the terminal nodes of a binary tree forms a partition of $\chi$, the target item shall belong to the subspace associated with one and only one terminal node, said terminal node corresponding to a defined score.

Scoring—Splitting of Associated Subspaces

The key to have a reliable scoring function is the construction of subspaces associated with nodes. The tree is built from the root node, and then level by level up to the height D is reached. The generated nodes are associated with an index value and a subspace, and stored in memory means.

The generation of associated subspaces follows two rules. First, as already explained, the subspace associated with the root node is the whole multidimensional space $\chi$. Then, if a node is a non-terminal node, its associated subspace is split into two disjoint subspaces $\epsilon_+$ and $\epsilon_-$ which are respectively associated with a first child node and a second child node of said non-terminal node, said splitting being performed by the processing unit according to a classifier minimizing the number of sample items which do not satisfy the given binary property to belong to the subspace $\epsilon_+$, and/or the number of sample items which satisfies the given binary property to belong to the subspace $\epsilon_-$.

Thus, the probability of satisfying the given binary property is higher for an item belonging to the subspace $\epsilon_+$ than for an item belonging to the subspace $\epsilon_-$. If the first child node is the left sibling and the second child node is the right sibling, the more the left a node will be, the higher its associated score will be.

The problem of how to find the best subspaces $\epsilon_+$ and $\epsilon_-$ is equivalent to known binary classification problems. Indeed, advantageously the function which has to be minimized is a weighted combination of the number of sample items which do not satisfy the given binary property to belong to the subspace $\epsilon_+$, and the number of sample items which do satisfy the given binary property to belong to the subspace $\epsilon_-$, the weights in said weighted combination being for example respectively the rate of sample items which satisfy the given binary property in the subspace being split into disjoint subspaces $\epsilon_+$ and $\epsilon_-$, and the rate of sample items which do not satisfy the given binary property in the subspace being split into disjoint subspaces $\epsilon_+$ and $\epsilon_-$, i.e. the rate of negative sample items in the subspace C:

$$\hat{\alpha}(C) = \frac{1}{n} \sum_{i=1}^{n} 1\{X_i \in C, Y_i = -1\} = \omega$$

and the rate of positive sample items in the subspace C $$\hat{\beta}(C) = \frac{1}{n} \sum_{i=1}^{n} 1\{X_i \in C, Y_i = +1\} = 1 - \omega$$

wherein $n(C) = n(\hat{\alpha}(C) + \hat{\beta}(C))$.

In a such case, an expression of the function to minimize may be:

$$\hat{L}_{\epsilon,\omega}(\epsilon_+) = \frac{2}{n}(1-\omega) \sum_{i=1}^{n} 1\{X_i \notin \epsilon_+, Y_i = +1\} + \frac{2}{n}\omega \sum_{i=1}^{n} 1\{X_i \in \epsilon_+, Y_i = -1\}$$

In other words, $\hat{L}_{\epsilon,\omega}(\epsilon_+)$=(rate of positive)×(rate of false negative)+(rate of negative)×(rate of false positive). Methods of supervised classification as for example CART, SVM, neuronal networks, etc., may be carried out by the processing means to quickly and efficiently find a subspace $\epsilon_+$ (and so on a subspace $\epsilon_-$) minimizing such an expression.

This splitting has not to be perfect, but efficient. A too precise splitting would describe random error or noise instead of real relationships between X and Y, and would excessively exaggerate minor fluctuation in the data: such a problem is called overfitting. To prevent it, the number of degrees of freedom is limited when splitting, leading to a simpler partition of subspace, and an increased learning speed.

Advantageously, the number of sample items taken into account and/or the number of dimensions of the space are voluntary reduced while deepening into the binary tree. For example, from one level to the next, only 10% of the sample items may be reused. Such technique, called data randomization, is another way to prevent overfitting, and then to improve efficiency in case of numerous dimensions.

For example, in some cases of data mining accuracy scoring, objects are webpages. The number of dimension may exceed ten thousand, while the number of sample items may exceed several billions. Risks of overfitting are very high.

Area Under the Curve

The capacity of a candidate scoring function s to discriminate between the positive and negative populations is generally evaluated by means of its ROC curve (standing for Receiver Operating Characteristic curve), a widely used functional performance measure which we recall below for clarity.

The true ROC curve of a scoring function s is the "probability-probability" plot given by:

$$t \in R \to (P\{s(X)>t|Y=-1\}, P\{s(X)>t|Y=+1\})$$

By convention, when a jump occurs, the corresponding extremities of the curve are connected by a line segment, so that s(x)'s ROC curve can be viewed as the graph of a continuous mapping $\alpha \in [0,1] \to ROC(s,\alpha)$.

It can be understood as "the rate of true positive items, in function of the rate of false positive items".

This curve provides a useful visual tool for assessing scoring performance: the closer to the left upper corner of the unit square $[0,1]^2$ the ROC curve, the better the scoring function s. It thus leads to a partial order on the set of all scoring functions: for all $(s_1; s_2)$, $s_2$ is said more accurate than $s_1$ when $ROC(s_1,\alpha) \leq ROC(s_1,\alpha)$ for all $\alpha \in [0,1]$.

The performance of a candidate s is usually summarized by a scalar quantity, the area under the ROC curve (AUC in short):

$$AUC(s) = \int_{\alpha=0}^{1} ROC(s, \alpha) d\alpha$$

The method according to the invention can be seen as a method for approximating the optimal ROC curve. Indeed, the provided scoring function is a piecewise linear approximation of the optimal ROC curve: each terminal node corresponds to a linear part of such approximation.

Indeed, at each split, the samples items belonging to $\epsilon_+$ have to be positive. In this case they are "true positive". Else, If they are negative, it means that they should have belong to $\epsilon_-$, and are actually "false positive". So each split corresponds to a point of the ROC curve having as coordinates (rate of negative sample items in $\epsilon_+$, rate of positive sample items in $\epsilon_+$). It forms a breakpoint of the piecewise linear approximation representing s.

Figure 3:
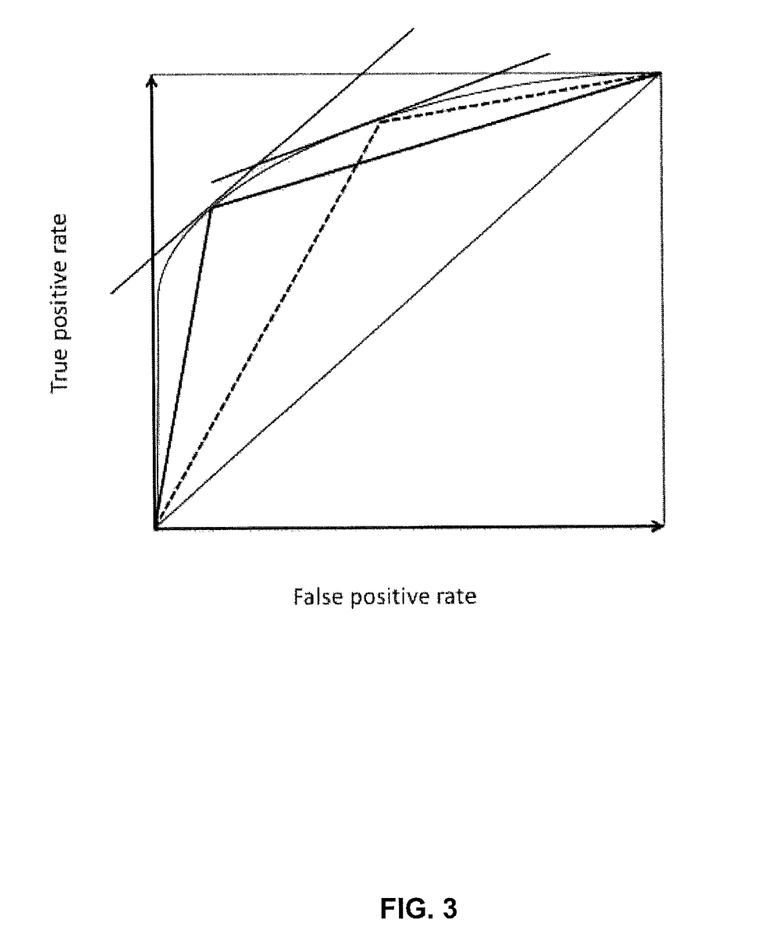
FIG. 3 is a graphic of an example test Receiver Operating Characteristic (ROC) curve of a method according to the first aspect of the invention.

By forming more levels in the binary tree, new breakpoints of the curve appears, leading to a finer approximation of the optimal ROC curve. An example of successive piecewise linear approximations of a ROC curve, corresponding to different height of the associated binary tree, and the optimal ROC curve, are visible on the FIG. 3.

Ranking Tree Pruning

A minimal number of terminal nodes is necessary to have a good approximation of the ROC curve, but having a large number of terminal nodes leads to overfitting: a partition of $\chi$ into too many subspaces reveals local noise, and the splitting becomes unstable (Slight modifications of the set of sample items used may lead to the learning of very different scoring functions, this problem will be more discuss in the next part). Moreover, as the number of nodes doubles at each level, formed binary trees may rapidly become hard to manipulate when their height increases, as the computational complexity of the scoring method depends on the number of nodes: large binary trees slow the processing means.

Figure 2:
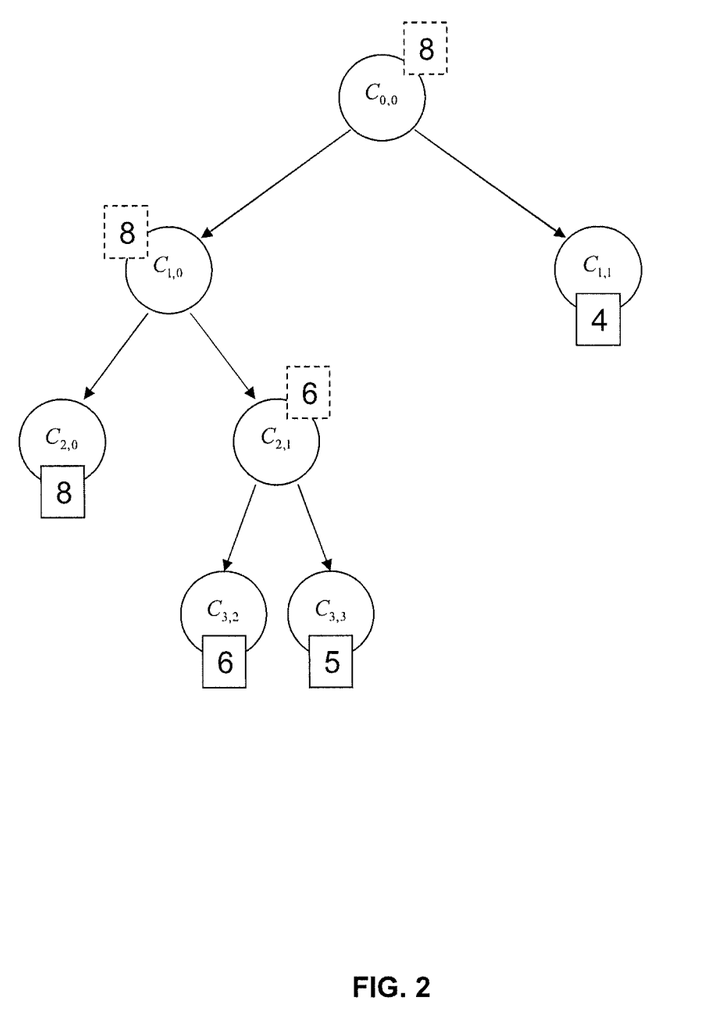
FIG. 2 represents an example of a binary subtree used in an embodiment of a method according to the first aspect of the invention.

In a preferred embodiment, the invention comprises a step of selecting by said processing means a subtree of the formed binary tree and replacing the binary tree by said subtree, said step following the step of forming a binary tree. The term "subtree" of a binary tree refers to a binary tree in which any node may be a terminal node. Else, a node has two children. In other words, this is an initially complete binary tree which may have been pruned by removing every descendant of at least one node. For example, FIG. 2 shows a possible subtree of the binary tree represented in FIG. 1.

This pruning step aims to optimally choose the height of the binary tree by forming a large tree and then removing nodes which do not increase performances, or even decrease it. Advantageously a ROC curve is built by the processing means for each possible subtree, and stored is the memory means. For each of these piecewise linear ROC curves, the AUC is calculated by the processing means.

A first possibility is then to select by the processing mean the subtree with the highest AUC. The selected subtree is the most efficient one, however it may be still a large tree, with a high computational complexity.

Alternatively, another criterion, named the "Complexity-penalized AUC" (CPAUC) is used:

$$CPAUC(s_T, \lambda) = AUC(s_T) - \lambda \cdot \#P(T)$$

where $\#P(T)$ is the number of terminal nodes and $\lambda$ is a tuning parameter governing the trade-off between training performance versus model computational complexity. The selected substree is in case the subtree with the highest CPAUC:

$$T_\lambda = \underset{T}{\mathrm{argmax}}\, CPAUC(s_T, \lambda)$$

$\lambda$ is an important parameter which has to be set, possibly manually, but which advantageously estimated thanks to a cross-validation test performed by the processing means on the set of possible subtrees $T_\lambda$ (which is a finite subset of the whole set of possible subtrees). In N-fold cross-validation, the original set of samples is randomly partitioned into N subsets. Of the N subsets, a single subset is retained as the validation data for testing the model (i.e. building the associated empirical ROC curve and calculating the AUC), and the remaining N−1 subsets are used as training data. The cross-validation process is then repeated N times (the folds), with each of the N subsamples used exactly once as the validation data. The N results from the folds then can be averaged (or otherwise combined) to produce a single estimation. The advantage of this method over repeated random sub-sampling is that all observations are used for both training and validation, and each observation is used for validation exactly once. The value $\hat{\lambda}$ that maximizes the cross-validated AUC is determined by the processing means, and the associated subtree $T_{\hat{\lambda}}$ is selected and stored in the memory means. 10-fold cross-validation is commonly used.

Ranking Forest—Principe

The main problem of machine-learning methods based on recursive splitting, like the previously described scoring method, is the instability. As already explained, slight modifications of the set of sample items used may lead to the learning of very different scoring functions.

Figure 4:
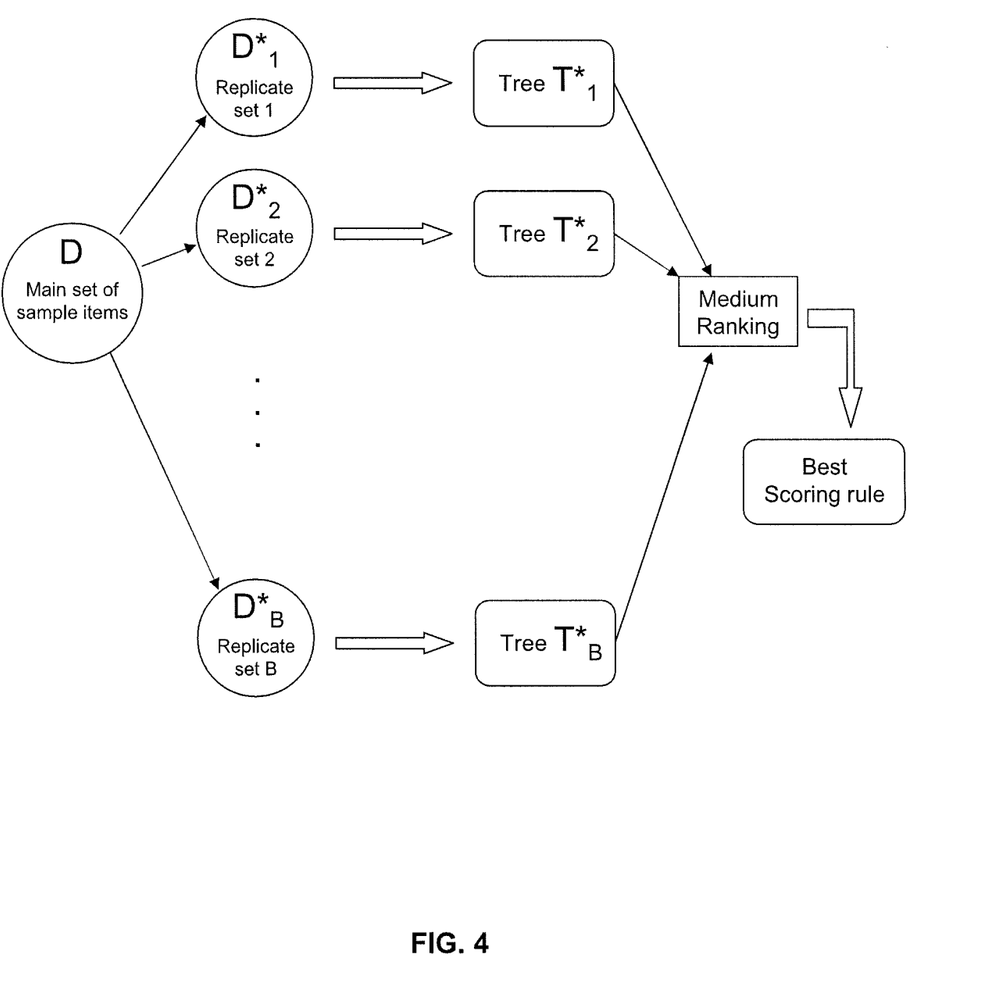
FIG. 4 is a diagram representing steps of an embodiment of a method according to the first aspect of the invention.

In a preferred embodiment, represented by the FIG. 4, a plurality of binary ranking trees, which can be called together a ranking forest, are produced and aggregated so as to improve the performance of single binary ranking trees in regards to the AUC criterion. To this end, a plurality of sets of sample items are generated and stored. From each of these different sets, a binary tree is formed.

A large set of sample items may be split. Alternatively, each set of sample items may be a bootstrap replicate. A bootstrap replicate is a set generated by resembling a main set of sample items.

Thus, to obtain B different sets of K sample items, only one set of N>K sample items is required. This is the main set D. The B bootstrap replicates $D^*_1, \ldots, D^*_B$ are then built by drawing with replacement sample items among the main set D. Due to the instability of the recursive splitting, such resampling is enough for producing sets of sample items from which independent binary trees $T^*_1, \ldots, T^*_B$ can be formed and associated scoring functions learnt.

These trees have then to be combined.

Ranking Forest—Aggregation

As the different binary trees are generated from different sample sets, their partitions of the multidimensional space $\chi$ formed by the subspaces associated with their terminal nodes are incompatibles. The first aim of aggregation is to build a new partition of $\chi$ which is compatible with the partitions of $\chi$ formed by the subspaces associated with the terminal nodes of any tree of the ranking forest.

To this end, for each formed binary tree the partition of the multidimensional space $\chi$ formed by the subspaces associated with the terminal nodes is provided and stored in memory means, and then these partitions are aggregated by said processing means to form a common subpartition. Indeed, if $P_1=\{C_k^{(1)}\}_{1\leq k\leq K_1}$ and $P_2=\{C_k^{(2)}\}_{1\leq k\leq K_2}$ are two partitions of $\chi$ related to binary trees $T_1$ and $T_2$ respectively, the common subpartition is the collection of subsets of the form $C_k^{(1)} \cap C_l^{(2)}$, $1\leq k\leq K_1$, $1\leq l\leq K_2$.

Figure 5:
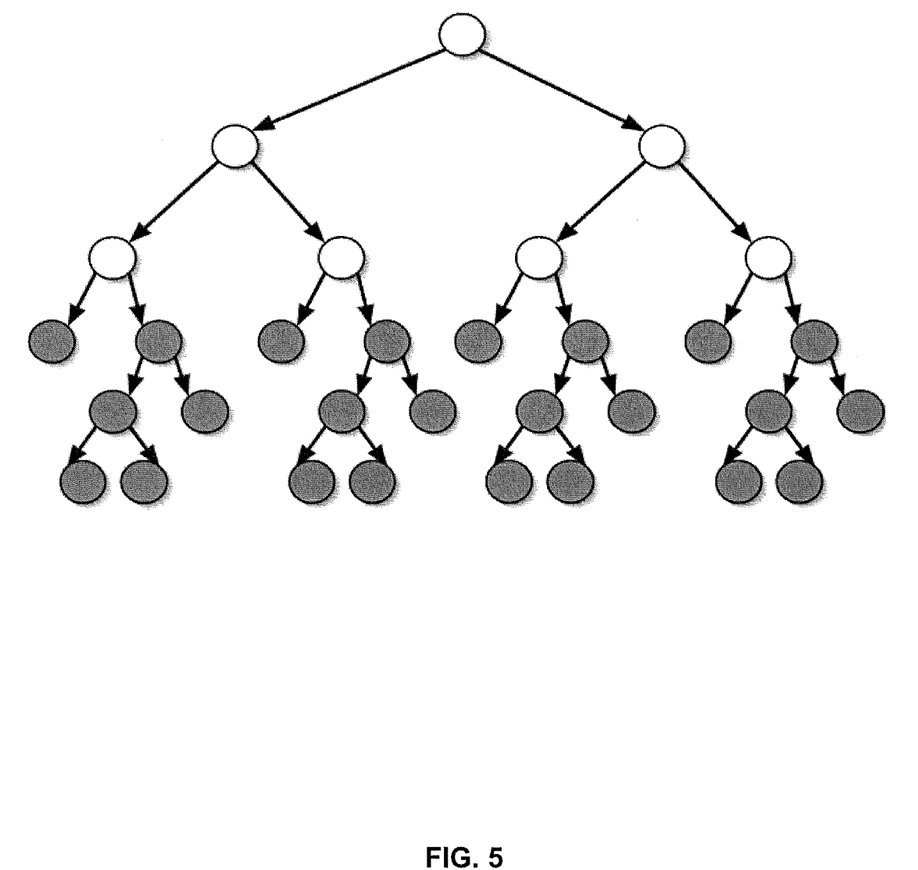
FIG. 5 represents an example of a binary subtree characterizing the largest common subpartition induced by tree-structured partitions, used in an embodiment of a method according to the first aspect of the invention.

Graphically, it can be obtained by extending the $T_1$ tree structure the following way: for any $k\in\{1,\ldots,K_1\}$, at the $T_1$'s terminal node associated with the subspace $C_k^{(1)}$, add a subtree corresponding to $T_2$ with $C_k^{(1)}$ as root. The subspaces associated with the terminal nodes of the resulting combined subtree, starting at the global root $\chi$, correspond to the common subpartition (it may be noticed that some of the parts of this subpartition can be empty), as represented by FIG. 5. This scheme can be iterated in order to recover all the parts of the subpartition induced by B>2 tree-structured partitions. For reasons of computational nature, the aggregation is advantageously started with the most complex tree and binds progressively less and less complex trees as one goes along.

Ranking Forest—The Median Ranking

The common subpartition makes comparable the scoring functions associated with different trees. When this subpartition is formed and stored in memory means, then for each formed binary tree of the ranking forest a scoring rule is provided by scoring each part of the common subpartition, and stored in memory means.

The next step is to provide and to store for each scoring rule a ranking of the parts scored according the scoring rule. In particular, the most natural way of defining a total order on the multidimensional space $\chi$ is to transport the natural order on the real line by means of the scoring function, i.e. a measurable mapping $s:\chi \to R$. A ranking $\preceq_s$ on $\chi$ is thus defined by:

$$\forall (X_1, X_2) \in \chi^2, X_1 \preceq_s X_2 \Leftrightarrow s(X_1) \leq s(X_2).$$

As the common subpartition comprises many more parts than any partition associated with a simple binary tree, some different parts may have the same score, making them "ex-aequo" with respect to their rank. To enable reliable comparison of the ranks of parts, as every item of a part C of the common subpartition $P^*(\chi)$ has the same score, the rank of a part C may for example be given by:

$$R_{\preceq_1}(C) = \sum_{C' \in P^*(\chi)} 1\{\forall (z, z') \in C \times C', z' \prec z\} +$$
$$\frac{1}{2}(1 + \#\{C' \in P^*(\chi) : \forall (z, z') \in C \times C', z' \preceq z \wedge z' \preceq z\})$$

where $z' \prec z$ means that only the relation $z' \preceq z$ is verified (i.e. z and z' have different scores).

Because the different rankings come from different sets of samples, in case of instability the rank of a given part of the common subpartition may vary according to the ranking $\preceq_s$. These variations of ranks reveal the most instable rankings. To the contrary, the ranking which should be selected is called the medium ranking, i.e. the less instable ranking.

Advantageously, to this end a dissimilarity rate between each pair of rankings is calculated by the processing means, and the ranking which shows the lowest dissimilarity rate with the other rankings is selected by said processing means as the median ranking, the dissimilarity rate being a criterion representative of the variability of ranks between two rankings.

For example, the median ranking may be a ranking $\preceq^*$ such that $$\sum_{m=1}^N \delta(\preceq^*, \preceq_m) = \min_{\preceq} \sum_{m=1}^N \delta(\preceq, \preceq_m)$$

where:
$\preceq_1 \ldots \preceq_N$ are the rankings, and
$\delta(\preceq_1, \preceq_2)$ is the dissimilarity rate between a pair of rankings.

Different formulas are known by a man skilled in the art for computing a dissimilarity rate in function in function of the ranks of the parts of the common subpartition. For example, one these three may be used:

The Spearman Rank-Order Correlation $$\delta(\preceq_1, \preceq_2) = \frac{1}{K} \sum_{i=1}^K (R_{\preceq_1}(C_i) - R_{\preceq_2}(C_i))^2$$

where:
$C_i \ldots C_K$ are the parts of the common subpartition, and
$R_{\preceq_1}(C_i)$ is the rank of the part $C_i$ among the other parts of the common subpartition according to the ranking $\preceq_1$.

The Spearman Footrule $$\delta(\preceq_1, \preceq_2) = \frac{1}{K} \sum_{i=1}^K |R_{\preceq_1}(C_i) - R_{\preceq_2}(C_i)|$$

where:
$C_i \ldots C_K$ are the parts of the common subpartition, and
$R_{\preceq_1}(C_i)$ is the rank of the part $C_i$ among the other parts of the common subpartition according to the ranking $\preceq_1$.

The Kendall Tau $$\delta(\preceq_1, \preceq_2) =$$
$$\frac{2}{K(K-1)} \sum_{i \neq j} 1\{(R_{\preceq_1}(C_i) - R_{\preceq_1}(C_j)) \cdot (R_{\preceq_2}(C_i) - R_{\preceq_2}(C_j)) < 0\} +$$
$$\frac{1}{K(K-1)} \sum_{i \neq j} 1\{R_{\preceq_1}(C_i) = R_{\preceq_1}(C_j), R_{\preceq_2}(C_i) \neq R_{\preceq_2}(C_j)\} +$$
$$\frac{1}{K(K-1)} \sum_{i \neq j} 1\{R_{\preceq_1}(C_i) \neq R_{\preceq_1}(C_j), R_{\preceq_2}(C_i) = R_{\preceq_2}(C_j)\}$$

where:
$C_i \ldots C_K$ are the parts of the common subpartition, and
$R_{\preceq_1}(C_i)$ is the rank of the part $C_i$ among the other parts of the common subpartition according to the ranking $\preceq_1$.

When the medium ranking is determined and stored in the memory means, the processing means can finally select as the best scoring rule the scoring rule associated with the median ranking.

Example

To illustrate the efficiency of the method according to the invention, the artificial data set of sample items represented in FIG. 6a has been generated as follows:

The unit square $\chi=[0,1]^2$ has been split into four quarters: $\chi_1=[0,1/2]^2$, $\chi_2=[1/2,1]\times[0,1/2]$, $\chi_{3,1}=[1/2,1]^2$ and $\chi_4=[0,1/2]\times[1/2,1]$.

Denoting by $U_C$ the uniform distribution on a measurable set $C\subset\chi$, the class distributions are given by $$H(dx)=0.2\cdot U_{\chi_1}+0.1\cdot U_{\chi_2}+0.3\cdot U_{\chi_3}+0.4\cdot U_{\chi_4},$$

$$G(dx)=0.4\cdot U_{\chi_1}+0.3\cdot U_{\chi_2}+0.2\cdot U_{\chi_3}+0.1\cdot U_{\chi_4},$$

wherein H(dx) and G(dx) are respectively the conditional distributions X given Y=+1 and X given Y=−1.

Figure 6A:
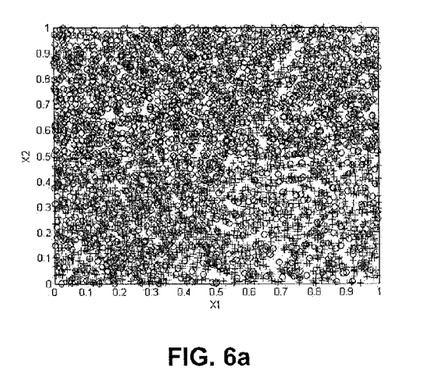
FIG. 6a represents an example of a set of sample items used to illustrate the method according to the first aspect of the invention.

Two thousand samples items has been used in this example: in the FIG. 6a, a "+" represents an item satisfying the given property (Y=+1) and a "o" represents an item not satisfying the given property (Y=−1). In this setup, optimal scoring functions are piecewise constant, like the regression function $$\eta(x)=\tfrac{2}{3}\cdot 1\{x\in\chi_1\}+0.75\cdot 1\{x\in\chi_2\}+0.4\cdot 1\{x\in\chi_3\}+0.2\cdot 1\{x\in\chi_4\}$$

Figure 6B:
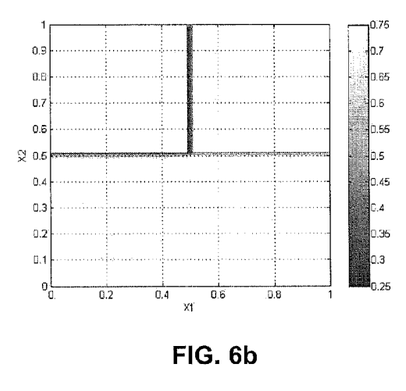

The regression function is the function providing a given X with the probability that Y=+1 (i.e. $\eta(x)=P\{Y=+1|X=x\}$). The bi-level sets of the regression function are represented by the FIG. 6b. The four areas of the square are clearly visible.

Figure 6C:
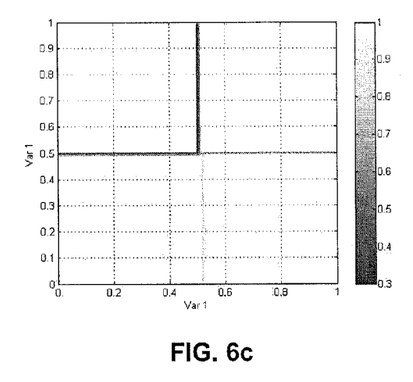
FIG. 6c is a graphic representing the bi-level sets of a scoring function learnt from the example of FIG. 5a using the method according to the first aspect of the invention.

The results of a method according to the invention are then represented by the FIG. 6c, representing the scoring function learnt from the set of sample items of FIG. 6a. The master ranking tree is grown according to the described method, next pruned via the N-fold cross-validation procedure described previously with ten bootstrap replicate. It can be observed that four levels of score appear, almost perfectly corresponding to the four areas of the square.

Figure 6D:
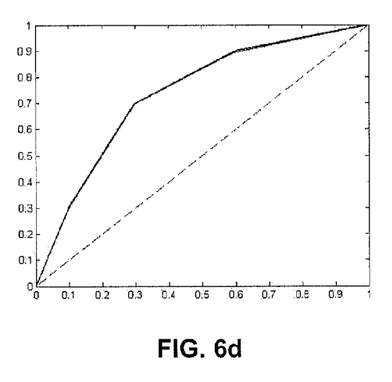
FIG. 6d is a graphic representing the optimal ROC curve and the test ROC curve of the scoring function of FIG. 5c.

FIG. 6d is a graphic representing the optimal ROC curve and the test ROC curve of the scoring function of FIG. 6c. We can assume that the two curves can hardly be distinguished.

Applications

As already explained, the method according to the invention allows numerous industrial or economic applications. Credit scoring, medical diagnosis and data mining accuracy scoring have been mentioned.

Besides, the method according to the invention is for example effective for quality control and/or failure detection. Indeed, on a factory production line, the quality of a production has to be assessed on the basis of a few criteria. In this case, the given binary property is "standard (or non-standard) product". A set of sample items can be easily set up by picking random products on the production line, and manually checking them. A failure can for example be detected if the rate of non-standard products exceeds a threshold.

In addition, the method according to the invention may apply to biology and chemistry, especially for molecules, proteins, catalysts, genes, etc. testing. It may enable to predict whether a molecule (or a protein, a catalyst . . . ) can have a given effect, by comparing its structure with the structure of other known molecules.

Many other applications in various fields are conceivable.

Decision-Support System

According to a second aspect, the invention concerns a decision-support system, comprising processing means, input means, output means, memory means. The processing means of said decision-support system are configured to implement a method of scoring as previously described.

Input means allows to input data representing the target item, and the set of sample items. They could be for example a keyboard, if the user wishes to manually input these data, or an interface with any computer, for example containing a database of samples. Output means are for example a display screen.

A man skilled in the art would know how to adapt the invention to any known type of computer language, any type of processor.

The invention claimed is:

1. A method for providing with a score an object represented by a target item from a multidimensional space, said score being representative of the probability that the object satisfies a given binary property, said method being performed in a computer environment comprising a processor connected to memory, comprising the following steps:
   (a) providing and storing in the memory data representative of a plurality of sets of sample items from said multidimensional space, each sample item being associated with a binary label indicating if an object represented by said example item satisfies or not the given binary property each set of sample items being a bootstrap replicate generated by said processor by resampling a main set of sample items;
   (b) storing in the memory data representative of the target item;
   (c) with said processor, for each set of sample items, generating and storing in said memory data representative of an oriented binary tree with a given height, said binary tree being defined by a plurality of nodes having index values in relation with their position in the binary tree, said nodes comprising a root node, intermediate nodes and terminal nodes, and each node being associated with a subspace of the multidimensional space according to the following rules:
   if the node is a root node, the associated subspace is the whole multidimensional subspace;
   if the node is a non-terminal node, its associated subspace is split into two disjoint subspaces $\epsilon_+$ and $\epsilon_-$ respectively associated with a first child node and a second child node of said non-terminal node, said splitting being performed by the processing unit according to a classifier minimizing the number of sample items which do not satisfy the given binary property to belong to the subspace $\epsilon_+$, and/or the number of sample items which satisfies the given binary property to belong to the subspace $\epsilon_-$;
   (d1) aggregating the plurality of formed binary trees and determining a best scoring rule, wherein the best scoring rule is a combination of binary rules that quantify the impact on each attribute or component of a vector of observation;
   (d) with said processor, associating with at least each terminal node of the binary tree the score depending on its index value in the binary tree, and storing the score value in the memory;
   (e) with said processor, identifying a target node, the target node being a terminal node whose associated subspace comprises the target item; and
   (f) outputting the score value associated with said target node.

2. A method according to claim 1, wherein the index value of each node comprises a pair of values, the first index value representing the depth of the node in the binary tree, and the second index value representing the position of the node at a given level of depth in the tree.

3. A method according to claim 2, wherein the index of the root node is (0,0), and the indexes of the first and the second child nodes of a non-terminal node whose index is (d,k) are respectively (d+1,2k) and (d+1,2k+1).

4. A method according to claim 3, wherein the score associated with a node whose index is (d,k) is $2^D(1-k/2^d)$, D being the height of the binary tree.

5. A method according to claim 1, wherein said splitting is performed by minimizing with said processor a weighted combination of the number of sample items which do not satisfy the given binary property to belong to the subspace $\epsilon_+$, and the number of sample items which do satisfy the given binary property to belong to the subspace $\epsilon_-$.

6. A method according to claim 5, wherein the weights in said weighted combination are respectively the rate of sample items which satisfy the given binary property in the subspace being split into disjoint subspaces $\epsilon_+$ and $\epsilon_-$, and the rate of sample items which do not satisfy the given binary property in the subspace being split into disjoint subspaces $\epsilon_+$ and $\epsilon_-$.

7. A method according to claim 6, wherein said splitting is performed by minimizing by said processor the value of $$\hat{L}_{\epsilon,\omega}(\varepsilon_+) = \frac{2}{n}(1-\omega)\sum_{i=1}^{n} 1\{X_i \notin \varepsilon_+, Y_i = +1\} + \frac{2}{n}\omega\sum_{i=1}^{n} 1\{X_i \in \varepsilon_+, Y_i = -1\}$$

where:
$(X_1, Y_1) \ldots (X_n, Y_n)$ is the set of sample items associated with their binary label, and
$\omega$ is the rate of sample items which satisfy the given binary property in the subspace being split into disjoint subspaces $\epsilon_+$ and $\epsilon_-$.

8. A method according to claim 1, wherein the number of sample items and/or the number of dimensions of associated subspace to take into account during said splitting is reduced.

9. A method according to claim 1, comprising a step (c1) of selecting by said processor a subtree of the formed binary tree and replacing the binary tree by said subtree, wherein said step (c1) follows step (c).

10. A method according to claim 9, wherein a Receiver Operating Characteristic curve is built by the processor at step (c1) for each possible subtree, and stored in the memory, the selected subtree being the subtree determined by the processor as having the highest Area Under its associated Receiver Operating Characteristic curve.

11. A method according to claim 9, wherein a Receiver Operating Characteristic curve is built by the processor at step (c1) for each possible subtree, and stored in the memory, the selected subtree being the subtree determined by the processor as having the highest Complexity-Penalized Area Under its associated Receiver Operating Characteristic curve.

12. A method according to claim 11, wherein step (c1) comprises a cross-validation test performed by the processor on the set of possible subtrees.

13. A method according to claim 1, wherein step (d1) comprises the following sub-steps:
for each formed binary tree, provide and store in said memory the partition of the multidimensional space formed by the subspaces associated with the terminal nodes;
aggregating by said processor these partitions to form a common subpartition;
for each formed binary tree, providing and storing a scoring rule by scoring each part of the common subpartition;
for each scoring rule, providing and storing a ranking of the parts scored according the scoring rule;
determining by said processor a median ranking among the plurality of ranking, and storing the median ranking in said memory; and
selecting by said processor as the best scoring rule the scoring rule associated with the median ranking.

14. A method according to claim 13, wherein the sub-step of determining a median ranking comprises calculating by said processor a dissimilarity rate between each pair of rankings, and selecting by said processor as the median ranking the ranking which shows the lowest dissimilarity rate with the other rankings.

15. A method according to claim 14, wherein the median ranking is a ranking $\preceq^*$ such that $$\sum_{m=1}^{N} \delta(\preceq^*, \preceq_m) = \min_{\preceq} \sum_{m=1}^{N} \delta(\preceq, \preceq_m)$$

where:
$\preceq_1 \ldots \preceq_N$ are the rankings, and
$\delta(\preceq_1, \preceq_2)$ is the dissimilarity rate between a pair of rankings.

16. A method according to claim 15, wherein the dissimilarity rate is defined as $$\delta(\preceq_1, \preceq_2) = \frac{1}{K}\sum_{i=1}^{K}(R_{\preceq_1}(C_i) - R_{\preceq_2}(C_i))^2$$

where:
$C_i \ldots C_K$ are the parts of the common subpartition, and
$R_{\preceq_1}(C_i)$ is the rank of the part $C_i$ among the other parts of the common subpartition according to the ranking $\preceq_1$.

17. A method according to claim 15, wherein the dissimilarity rate is defined as $$\delta(\preceq_1, \preceq_2) = \frac{1}{K}\sum_{i=1}^{K}|R_{\preceq_1}(C_i) - R_{\preceq_2}(C_i)|$$

where:
$C_i \ldots C_K$ are the parts of the common subpartition, and
$R_{\preceq_1}(C_i)$ is the rank of the part $C_i$ among the other parts of the common subpartition according to the ranking $\preceq_1$.

18. A method according to claim 15, wherein the dissimilarity rate is defined as $$\delta(\preceq_1, \preceq_2) =$$
$$\frac{2}{K(K-1)}\sum_{i\neq j} 1\{(R_{\preceq_1}(C_i) - R_{\preceq_1}(C_j))\cdot(R_{\preceq_2}(C_i) - R_{\preceq_2}(C_j)) < 0\} +$$
$$\frac{1}{K(K-1)}\sum_{i\neq j} 1\{R_{\preceq_1}(C_i) = R_{\preceq_1}(C_j), R_{\preceq_2}(C_i) \neq R_{\preceq_2}(C_j)\} +$$
$$\frac{1}{K(K-1)}\sum_{i\neq j} 1\{R_{\preceq_1}(C_i) \neq R_{\preceq_1}(C_j), R_{\preceq_2}(C_i) = R_{\preceq_2}(C_j)\}$$

where:
$C_i \ldots C_K$ are the parts of the common subpartition, and
$R_{\preceq_1}(C_i)$ is the rank of the part $C_i$ among the other parts of the common subpartition according to the ranking $\preceq_1$.

19. A decision-support system, for providing with a score an object represented by a target item from a multidimensional space, said score being representative of the probability that the object satisfies a given binary property, the system comprising a processor, input means, output means, memory, the processor being configured to perform steps of:

(a) providing with the input means and storing in the memory data representative of a plurality of sets of sample items from said multidimensional space, each sample item being associated with a binary label indicating if an object represented by said example item satisfies or not the given binary property, each set of sample items being a bootstrap replicate generated by said processor by resampling a main set of sample items;

(b) storing in the memory data representative of the target item;

(c) for each set of sample items, generating and storing in said memory data representative of an oriented binary tree with a given height, said binary tree being defined by a plurality of nodes having index values in relation with their position in the binary tree, said nodes comprising a root node, intermediate nodes and terminal nodes, and each node being associated with a subspace of the multidimensional space according to the following rules:

if the node is a root node, the associated subspace is the whole multidimensional subspace;

if the node is a non-terminal node, its associated subspace is split into two disjoint subspaces $\epsilon_+$ and $\epsilon_-$ respectively associated with a first child node and a second child node of said non-terminal node, said splitting being performed by the processing unit according to a classifier minimizing the number of sample items which do not satisfy the given binary property to belong to the subspace $\epsilon_+$, and/or the number of sample items which satisfies the given binary property to belong to the subspace $\epsilon_-$;

(d1) aggregating the plurality of formed binary trees and determining a best scoring rule, wherein the best scoring rule is a combination of binary rules that quantify the impact on each attribute or component of a vector of observation;

(d) associating with at least each terminal node of the binary tree the score depending on its index value in the binary tree, and storing the score value in the memory;

(e) identifying a target node, the target node being a terminal node whose associated subspace comprises the target item; and (f) outputting on the output means the score value associated with said target node.

* * * * *